US005636016A

United States Patent [19]
Coetsier et al.

[11] Patent Number: 5,636,016
[45] Date of Patent: Jun. 3, 1997

[54] APPARATUS AND METHOD FOR THE GEOMETRIC INSPECTION OF VEHICLES WITH STEERED WHEELS

[75] Inventors: Paul Coetsier, Pomponne; Denis Douine, Lagny, both of France

[73] Assignee: Muller Bem, Chartres, France

[21] Appl. No.: 327,049

[22] Filed: Oct. 21, 1994

[30]   Foreign Application Priority Data

Oct. 22, 1993 [FR] France .................... 93 12617

[51] Int. Cl.⁶ .............. G01B 11/26; G01B 5/24
[52] U.S. Cl. .................... 356/139.09; 33/203.18
[58] Field of Search ............. 356/139.09, 152.1, 356/155; 33/203.18, 288

[56]                References Cited

U.S. PATENT DOCUMENTS

| | | | |
|---|---|---|---|
| Re. 33,144 | 1/1990 | Hunter et al. | 356/139.09 |
| 4,381,548 | 4/1983 | Grossman et al. | 364/424.05 |
| 4,402,603 | 9/1983 | Lill | 356/139.09 |
| 4,761,749 | 8/1988 | Titsworth et al. | 364/559 |
| 4,931,964 | 6/1990 | Titsworth et al. | 364/559 |
| 5,014,227 | 5/1991 | Kling et al. | 364/559 |
| 5,165,177 | 11/1992 | Kerchek | 33/203.18 |
| 5,220,399 | 6/1993 | Christian et al. | 356/139.09 |
| 5,257,458 | 11/1993 | Koerner | 33/203.12 |

FOREIGN PATENT DOCUMENTS

WO81/01047  4/1981  WIPO .

Primary Examiner—Thomas H. Tarcza
Assistant Examiner—Pinchus M. Laufer
Attorney, Agent, or Firm—Young & Thompson

[57]                ABSTRACT

Apparatus for geometric measurement, particularly for a vehicle with steered wheels or wheels that are only slightly steered or are not steered, of the type comprising two first measuring casings and two second measuring casings from each of which second casings extends a longitudinal arm carrying at its end an angular measuring device. The two first casings (6, 7) are fixed on the steered wheels (2, 3) and the two second casings (8, 10, 12; 9, 11, 13) are secured on the unsteered or only slightly steered wheels (4, 5), so as to avoid any substantial deviation of the arms (10, 11) during geometric measurement of the vehicle. The first casings (6, 7) are each substantially internal to an imaginary geometrical cylinder ($C_6$ or $C_7$) with an axis ($A_6$ or $A_7$) corresponding to the axis of rotation of the steered wheel (2 or 3) and of a diameter corresponding to the diameter of the rim of the wheel (2, 3). The second casings (8, 9) each have an arm (10, 11) which passes through while extending longitudinally of an imaginary geometrical cylinder ($C_8$ or $C_9$) having an axis ($A_8$ or $A_9$) corresponding to the axis of rotation of the unsteered or only slightly steered wheel (4 or 5) and of a diameter corresponding to the diameter of the rim of the unsteered or only slightly steered wheel (4 or 5).

12 Claims, 3 Drawing Sheets

APPARATUS AND METHOD FOR THE GEOMETRIC INSPECTION OF VEHICLES WITH STEERED WHEELS

FIELD OF THE INVENTION

The present invention relates to an apparatus for the geometrical inspection of vehicles with steered wheels, as well as to a method of using such an apparatus.

BACKGROUND OF THE INVENTION

To carry out geometric inspection of vehicles, there is usually secured to each wheel an individual measurement housing of known type.

French publication 2.304.057 discloses an apparatus for the inspection of parallelism of the front wheels of a vehicle, which comprises two casings of known type interconnected by a resilient connection member.

EP 015.826 discloses a geometric inspection apparatus for vehicles comprising four casings permitting obtaining six emissions and six receptions of laser beams.

The unpublished U.S. patent application Ser. No. 08/320242 filed Oct. 11, 1994, by the applicant also discloses an example of casing permitting obtaining the angles characteristic of the geometry of the vehicle.

At the outset, the apparatus for geometric measurement of the angles of wheels, of parallelism, of camber, of steering axis inclination and of pivoting were obtained by means of two measurement casings which were moved from one axle to the other to effect geometric measurement. This arrangement of the prior art had the drawback that it was necessary to dismount, then to remount the measurement casings from one axle to the other, in which case there were errors due to mounting and required frequent calibration operations.

The art has thus evolved toward the use of individual casings, each measurement casing being secured to a corresponding wheel of the vehicle, the casings being interconnected by resilient members connecting for example the electrical, electro-magnetic or the like angular receivers of known type.

Thanks to this arrangement, it was possible to note the following geometric characteristics of the vehicle: front and rear angles of parallelism, angles of orientation of each individual wheel relative to selected reference axes (the reference axes chosen are generally the axis of symmetry of the vehicle which corresponds to the mid line of the front and rear axles and the axis of geometry of the vehicle which corresponds to the bisector of the angles of orientation of the rear wheels).

To obtain complete measurements, so as to determine the pivot angles and angles of steering axis inclination, it proved to be necessary to provide in the measurement casings of the front steered wheels inclinometers thanks to which there would be carried out the following measurement method: the front steered wheels are turned to the left and then to the right while measuring the turning angles corresponding to each direction of turning, there are measured simultaneously the variations of the angles by means of inclinometers and the angles of inclination of the steering axes and of pivoting are determined by computation.

In the known systems, pivoting plates permitting turning the front wheels of the vehicle do not ordinarily comprise receivers of angles supplying directly the turning angle of each steering wheel. This drawback is overcome in known systems by using measurements supplied by six angular receivers, in which four are disposed in the two casings of the front steerable wheels and of which two are disposed in the two casings of the unsteered wheels, and by computing from the measurements of angles obtained the turning angles of the steered wheels by means of a computation system with a microprocessor of known type.

Because of this, in this arrangement, the two casings of the front wheels comprise two arms which extend longitudinally toward the front of the vehicle. When the front steerable wheels are turned, the ends of these arms have a slight vertical clearance movement from the geometric arrangement of the front wheel, which results in a measurement error or a substantial deviation, in particular because of the fact that the angles of steering axis inclination and of pivoting of the wheel are not zero. In an extreme case, a substantial vertical clearance gives rise to contact at the end of the angular receiver located at the end of a casing arm of a front wheel, this contact completely nullifying the measurements. In the other case, when the entire geometric inspection apparatus is disposed on a raised bridge, the elements of the raised bridge which are located in the space comprised between the two arms mentioned above are also susceptible to interfere with the operation of the angular arm receivers and to nullify these measurements: this is the case in particular for the safety bars and contours located in front of the path of the vehicle and adapted to avoid any untimely movement of the vehicle.

Similarly, in the case of vehicles having an aerodynamic geometry and a very low shock absorber or a spoiler, it is not possible to provide a transverse resilient connection between the receivers of the front arms or to provide for the passage of an optical measuring beam.

SUMMARY OF THE INVENTION

The invention has for its object to overcome the mentioned drawbacks by creating a new apparatus for geometric inspection, permitting the geometric inspection of any type of vehicle.

The invention has for its object an apparatus for geometric inspection, particularly for a vehicle with steered wheels and wheels that are only slightly steered or unsteered, of the type comprising two first measuring casings and two second measuring casings from each of which two casings extend a longitudinal arm carrying at its end an angular measurement means, characterized in that the two first casings are fixed on the steered wheels and the two second casings are fixed on the unsteered or slightly steered wheels, so as to avoid any substantial deviation of the arms during geometric inspection of the vehicle.

According to other characteristics of the invention:
- the first casings are each substantially internal to a geometric cylinder whose axis corresponds to the axis of rotation of the wheel and of diameter corresponding to the diameter of the rim of the wheel.
- the second casings each have an arm which passes through while extending longitudinally of a geometric cylinder whose axis corresponds to the axis of rotation of the wheel and of a diameter corresponding to the diameter of the rim of the wheel.
- the paths of action or emission and of reception or of communication between the casings that face each other are practically invariable during the course of geometric inspection of the vehicle.
- at least two measurement casings are in communication via a wireless connection (of the Hertzian type or by optical connection).

The invention also has for its object a process for using the device according to the invention characterized by the following steps:

a. there is measured on the front axle the angles of orientation of the steered wheels relative to the direction paths, the angles of orientation of the slightly steered wheels relative to the connection paths and the transverse angles relative to the connection path, and these measurements are stored.

b. the measurements stored in the preceding step are processed by means of a programmable processing and computation card to derive values of total parallelism and of individual parallelism relative to a selected axis of the vehicle.

According to the characteristics of the invention:

one changes as desired by simple interactive control with a display screen the reference axis for the computation of parallelism.

one measures and computes the angles of steering ($BG_0$–$NG_0$, $ND_0$–$BD_0$) of the left and right steered wheels when the direction is centered and these values are stored, then there are measured and computed the turning angles (RG, RD) in turned position by means of the following formulae:

$$RG = BG - BG_0 - NG + NG_0$$

$$Ra = -BD + BD_0 + ND - ND_0.$$

one measures the inclinations and the camber of the steered wheels when the direction is centered, then one turns the wheels to compute with the aid of the cambers and the inclinations the values of angle of inclination of the steering axis and of the pivot of the steered wheels.

the measurements and the computations are displayable and available in real time on a display screen of a casing selected as the master casing.

BRIEF DESCRIPTION OF THE DRAWINGS

The invention will be better understood from the description which follows given by way of nonlimiting example with reference to the accompanying drawings, in which.

DETAILED DESCRIPTION OF THE INVENTION

Figure 1:
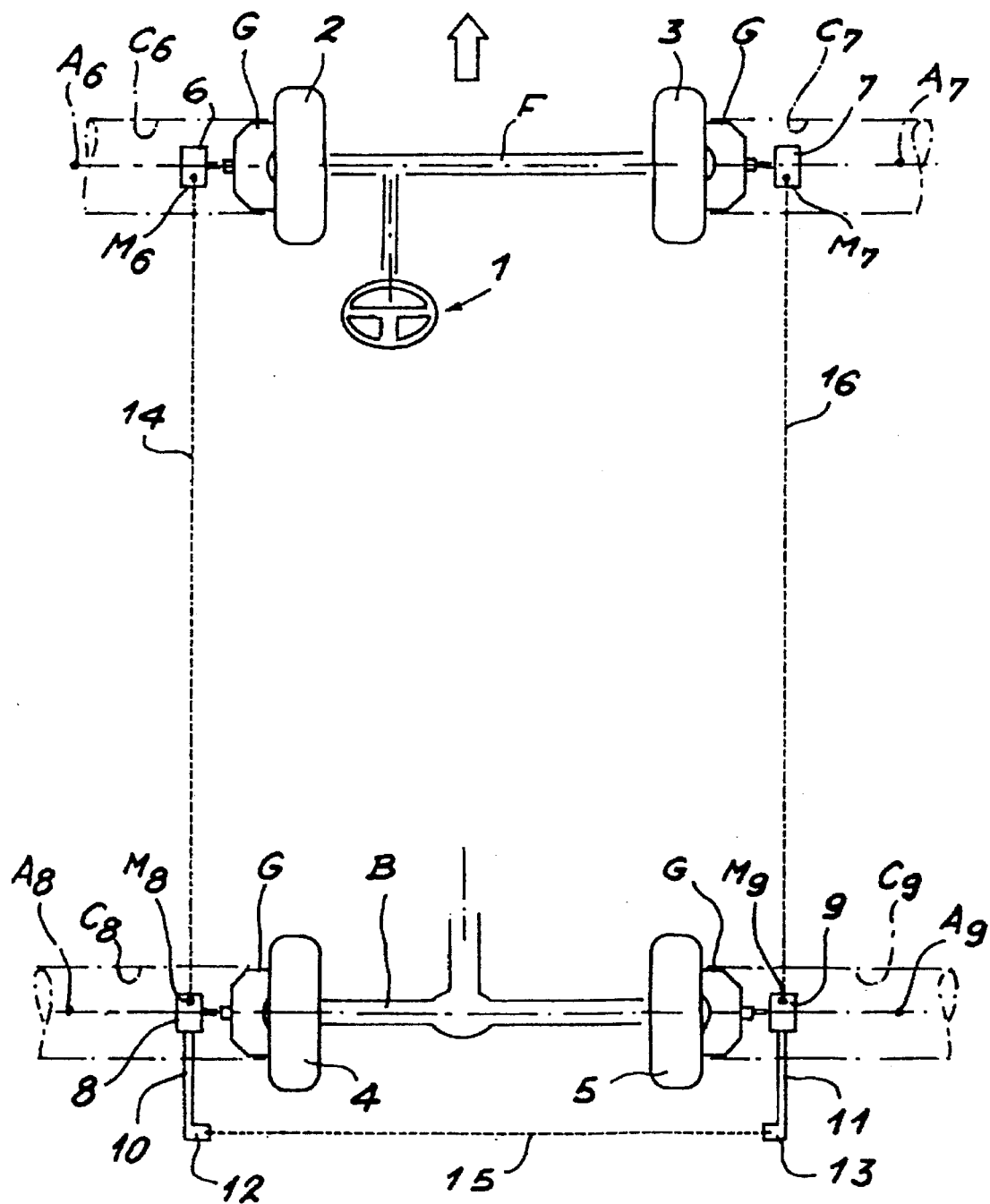
FIG. 1 shows schematically in top plan view an apparatus according to the invention.

According to FIG. 1, a vehicle is shown provided with a steering wheel 1 for steering two front steered wheels 2 and 3 mounted on a front axle F and a rear axle B comprising two rear wheels 4 and 5 which are not steered or only slightly steered. By only slightly steered will be understood wheels whose maximum angle of steering is less than 10 degrees of arc.

The first measurement casing 6 is fixed to the front steered wheel 2, a second measurement casing 7 is fixed to the front steered wheel 3, a third measurement casing 8 is fixed to the rear wheel 4 and a fourth measurement casing 9 is fixed to the rear wheel 5 by supports G provided with clamps in engagement with the wheel rims of known type which do not require more detailed description.

The front casings 6 and 7 fixed to the wheels 2 and 3 each have a shape which is substantially included within an imaginary geometric cylinder $C_6$ or $C_7$. Each cylinder $C_6$ (or $C_7$) has an axis $A_6$ (or $A_7$) corresponding to the axis of rotation of the wheel 2 (or 3) and a diameter corresponding to the diameter to the rim of the wheel 2 (or 3). Thus, when the wheels 2 or 3 are turned by large turning angles, the measurement casings 6 or 7 will not come into contact with the chassis of the vehicle or with the nearby structural elements.

The rear receivers 8 and 9 each comprise an arm 10 or 11. At the end of each arm 10 or 11 is mounted a receiver 12 or 13 permitting obtaining the geometric values transverse to the longitudinal direction of the vehicle. For this purpose the arm 10 or the arm 11 passes through an imaginary geometric cylinder $C_8$ or $C_9$. Each geometric cylinder $C_8$ or $C_9$ has an axis $A_8$ or $A_9$ corresponding to the axis of rotation of the wheel 4 or 5 and a diameter corresponding to the diameter of the rim of wheel 4 or 5.

Each casing 6 to 9 comprises a means $M_8$ to $M_9$ for geometric or angular measurements, each of which coacts with another means facing the same to effect measurements of angles or measurements of distances by transformation of mechanical, electrical, electromagnetic, optical or other signals: these measurement principles are well known in the prior art and particularly from the Patant application Ser. No. 08/320,242 mentioned above and so will not be described more precisely here.

The important thing is that the path of action (in the case of resilient connections known as mechanical systems with stretchers) or the path of emission and reception of light rays connecting a receiver, for example, the receiver $M_6$, to the facing receiver, for example $M_8$, with which it coacts, remain free of any mechanical or optical interference. The paths of action or of light emission and reception 14, 15, 16, interconnect the respective receivers: $M_6$ to $M_8$, 12 to 13, $M_7$ to $M_9$.

Thanks to the invention, the paths 14, 15, 16 of action or of emission are practically invariable during turning of the front steerable wheels to the right or to the left, which permits the use of the device according to the invention for geometric measurement of any type of vehicle.

Figure 2:
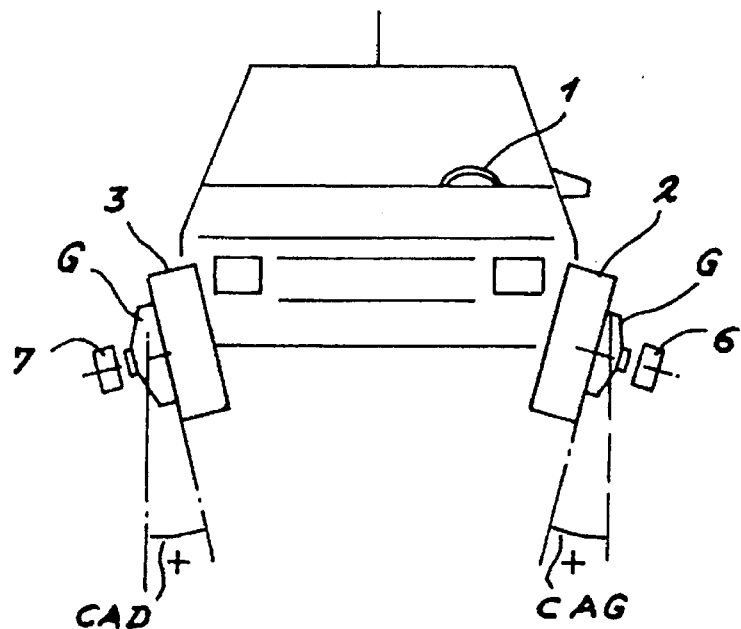
FIG. 2 shows schematically in front elevational view an apparatus according to the invention.
Figure 3:
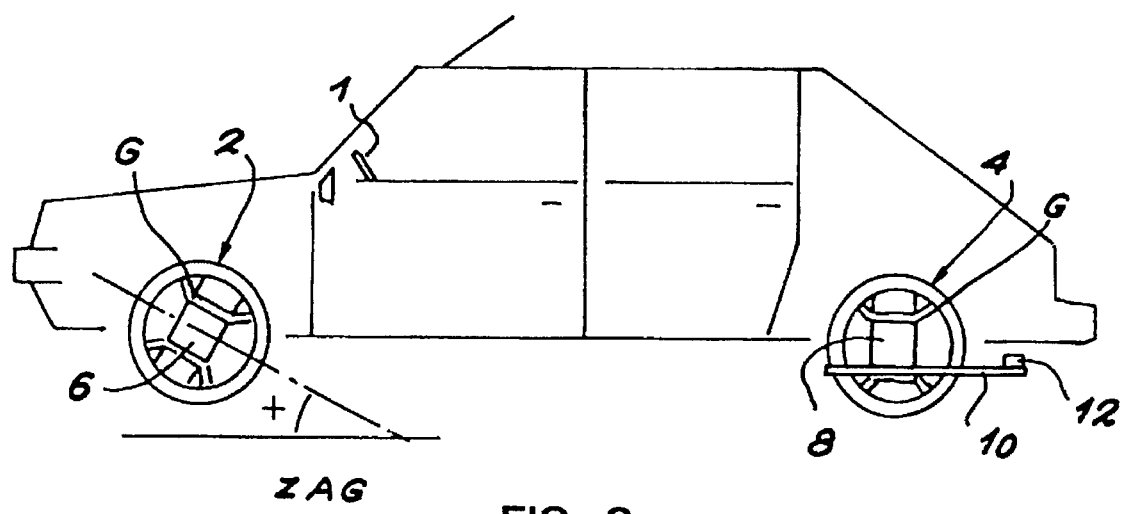
FIG. 3 shows schematically a side elevation view of an apparatus according to the invention.

With reference to FIGS. 2 and 3, identical reference numerals are used as in FIG. 1 to designate identical or similar elements to those of FIG. 1.

The measurement casings 6, 7 and 8 and the transmission means between these casings are preferably of the type described in patent application Ser. No. 08/320,242 mentioned above and can if desired be connected to a central data station for collecting and combining data received from the measurement casings 6 to 9.

The central data station (not shown) can ensure data processing and centralized dialogue, or alternatively the control of the system can be ensured by a portable terminal connectable to each casing or by a particular casing becoming upon demand the master casing directing the other casings.

The usable transmission means can be transmissions by wire, with a current outlet or not, by Hertzian path (wireless transmission or radio transmission) or by pulsed or coded optical connection.

In FIGS. 2 and 3, the reference CAD indicates the camber angle of the right wheel 3, the reference CAG indicates the camber angle of the left wheel 2 with a positive sign as indicated in FIG. 2, while the reference ZAG indicates the angle of inclination of the casing 6 mounted on the left wheel 2 and the reference ZAD is (which is not visible) is likewise the angle of inclination of the casing 7 mounted on the right wheel 3. These angular values will be used hereinafter in the description of the method according to the invention.

Figure 4:
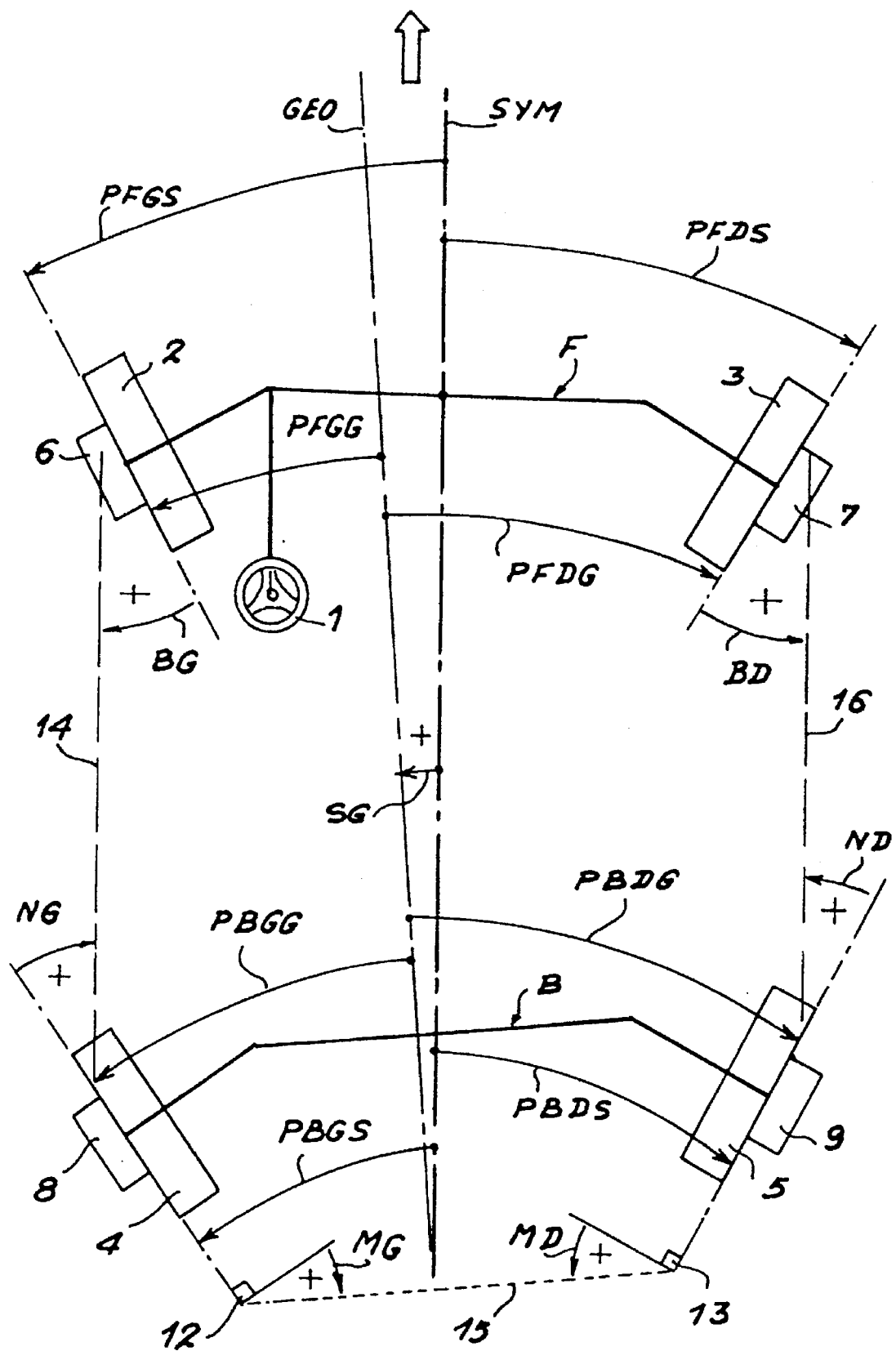
FIG. 4 show an explanatory diagram for practicing a method of use of the apparatus according to the invention.

With reference to FIG. 4 in which the angular deviations are deliberately amplified for clarity of explanation, the six angles of orientation measured are the following:

BG is the angle of orientation of the casing 6 (and of the steered wheel 2) with the line 14.

BD is the angle of orientation of the casing 7 (and of the steered wheel 3) with the line 16.

NG is the angle of orientation of the casing 8 (and of the rear wheel 4) with the line 14.

ND is the angle of orientation of the casing 9 (and of the rear wheel 5) with the line 16.

MG is the angle of orientation of the receiver 12 with the line 15.

MD is the angle of orientation of the receiver 13 with the line 15.

All the angles BG, BD, NG, ND, MG, and MD described above are of positive algebraic sign corresponding to the arrows of FIG. 4.

In the method of use of the apparatus according to the invention, there are obtained all the usual geometric values by simple computation executed in corresponding steps of integrated programs in a computer with a memory which is an integral part of the apparatus according to the invention: these cards for processing and computation with a microprocessor are available to the public or are manufactured specifically as provided in patent application Ser. No. 08/320,242.

Thus, to determine the total front angles of parallelism: PFT, of total rear parallelism: PBT, of parallelism of the left rear wheel 4 relative to the geometric axis GEO: PBGG, of parallelism of the right rear wheel 5 relative to the geometric axis GEO: PBDG, of parallelism of the left front wheel 2 relative to the axis of symmetry SYM: PFGS, of parallelism of the right front wheel 3 relative to the axis of symmetry SYM: PFDS, the recited processing and computation means for the angles measured carries out the following operations:

$$PFT = NG + ND - BG - BD - MG - MD$$
$$PBT = MG - MD$$
$$PBGG = PBT/2 = \frac{-MG - MD}{2}$$
$$PBDG = PBT/2 = \frac{-MG - MD}{2}$$
$$PFGS = \frac{-MG - MD + NG + ND - 2BG}{2}$$
$$PFDS = \frac{-MG - MD + NG + ND - 2BG}{2}$$

In FIG. 4, in the case in which the conventions of the usual sign corresponding to a positive sign are taken for the closing and a negative sign for opening, the angles PFGS, PFDS, PFGG, PFDG are negative because the front wheels 2 and 3 are in open position and the angles PBGG, PBDG, PBGS, PBDS are negative because the rear wheels 4 and 5 are in open position.

The angle SG between the axis GEO of geometry of the vehicle and the axis SYM of symmetry of the vehicle and the axis SYM of symmetry of the vehicle is positive in FIG. 4, this angle SG corresponding to the change of the reference axis of the angles of parallelism of each individual wheel 2 to 5.

This angular value SG is usually called "offset" or "crab" by specialists and is computed from the equation:

$$SG = \frac{NG - ND}{2}$$

Preferably, the apparatus according to the invention is programmable and contains a program permitting the change of the reference axis upon simple control by the operator, which permits computing the angles of parallelism of the left rear wheel 4 relative to the axis SYM of symmetry: PBGS, of parallelism of the right rear wheel 5 relative to the axis SYM of symmetry: PBDS, of parallelism of the left front wheel 2 relative to the axis GEO of geometry: PFGG, of parallelism of the right front wheel 3 relative to the axis of the geometric axis GEO: PFDG, by direct computation from the six measured values BG, BD, NG, ND, MG, MD by means of the following equations:

$$PBGS = \frac{-MG - MD + NG - ND}{2}$$
$$PBDS = \frac{-MG - MD - NG + ND}{2}$$
$$PFGG = \frac{-MG - MD}{2} + NG - BG$$
$$PFDG = \frac{-MG - MD}{2} + ND - BD$$

In the centered direction position corresponding generally to the middle of the steering rack as well as in the course of adjustment, the measuring casings 6 to 9 are preferably constantly active to measure, compute and display in real time all the mentioned angles on the screen for display, measurement and choice of the measurement program to be carried out.

The measuring casings 6 to 9 also permit obtaining the steering angles and displaying them after memorization of the angles $BG_0$, $BD_0$, $NG_0$, $ND_0$ corresponding to the measurements of the angles BG, BD, NG, ND when the direction is centered.

The steering angles of the left front wheel 2: RG, of the right front wheel 3: RD are obtained in real time by the following equations:

$$RG = BG - BG_0 - NG + NG_0$$
$$RD = BD + BD_0 + ND - ND_0$$

by using as the positive direction of steering for RG and RD the direction of steering to the left.

To determine the angles of inclination of the steering axis and of pivoting of the front wheels, there is used the measurement of the angles CAD, CAG, ZAD, ZAG indicated on FIGS. 2 and 3, these measurements being effected by inclinometers mounted in the measuring casings 6 and 7 of the front wheels 2 and 3, as in the patent application Ser. No. 08/320,242 mentioned above.

To this end, there are measured and stored the measurements of the angles of camber and of inclination corresponding to a centered direction: these measurements are the values $CAG_0$, $CAD_0$, $ZAG_0$, $ZAD_0$.

A steering is effected in the left direction, and is measured as indicated above and the following angles are determined by computation:

$RG_g$: angle of steering of the left wheel, when steering to the left, $RD_g$: angle of steering of the right wheel, during steering in the left direction, and having measured with the aid of inclinometers and memorized directly the following angles:

$CAG_g$: angle of camber of the left wheel, during steering to the left, $CAD_g$: angle of camber of the right wheel, during steering in the left direction, $ZAG_g$: angle of inclination of the left wheel, during steering in the left direction, $ZAD_g$: angle of inclination of the right wheel, during steering in the left direction.

Then there is effected a steering to the right and one measures directly or one determines by computation the following angles:

$RG_d$: camber angle of the left wheel, during steering to the right, $RD_d$: steering angle of the right wheel, during steering to the right, having measured with the aid of inclinometers and directly memorized the following angles:

$CAG_d$: camber angle of the left wheel, during steering to the right, $CAD_d$: camber angle of the right wheel, during steering to the right, $ZAG_d$: angle of inclination of the left wheel, during steering to the right, $ZAD_d$: angle of inclination of the right wheel, during steering to the right.

Thanks to the processing and computation means forming an integral part of the apparatus according to the invention, there are obtained the angles of inclination of the steering axis and of pivoting by means of the following equations:

$$CHG = \text{Arctan}\left[\frac{\sin(CAG_d - CAG_0) - \sin(CAG_g - CAG_0)}{\sin RG_d - \sin RG_g}\right]$$

$$CHD = \text{Arctan}\left[\frac{\sin(CAD_d - CAD_0) - \sin(CAD_g - CAD_0)}{\sin RD_d - \sin RD_g}\right]$$

$$PIG = \text{Arctan}\left[\frac{\sin(ZAG_d - ZAG_0) - \sin(ZAG_g - ZAG_0)}{\sin RG_d - \sin RG_g}\right]$$

$$PID = \text{Arctan}\left[\frac{\sin(ZAD_d - ZAD_0) - \sin(ZAD_d - ZAD_g)}{\sin RD_d - \sin RD_g}\right]$$

wherein
the references CHG, CHD, PIG, PID, indicate respectively the left and right angles of inclination of the steering axis, the left and right pivoting angles.

Given that all the equations are obtained by a combination of elementary operations (addition, subtraction) and of trigonometric operations and that all these operations are now integrated into the computation means of commercial mathematical co-processors, those in the art will have no difficulty practicing the programming of such operations with the aid of the card for data processing and computation disclosed in patent application Ser. No. 08/320,242.

The invention thus permits by means of a simple apparatus and of a programmed computation method, obtaining in real time all the indications, and all the angular and trigonometric measurements required for the geometric inspection of vehicles.

The invention described with reference to a particular embodiment is in no way thereby limited, but covers on the contrary all modifications of shape and all variations of the embodiment within the scope and spirit of the invention: the invention thus extends to apparatus comprising four second casings with arms, in which the angular measurement means disposed beyond the steering wheels are not active. To determine whether a system with four arms is dependent on the present invention, it suffices to render inactive said angular measuring means disposed outside the steering wheels, either by physically disconnecting them, or by cutting off their supply or their communication, or by preventing their operations.

We claim:

1. Apparatus for geometric measurement for a vehicle having a longitudinal axis, a steering wheel, steered wheels and wheels that are only slightly steered or are not steered, comprising two first measuring casings and two second measuring casings, an arm substantially parallel to said longitudinal axis, extending from each of said second measuring casings, each arm carrying at its end angular measuring means; each of said two first measuring casings not having any arm extending therefrom, said two first measuring casings (6, 7) being fixed on the steered wheels (2, 3) and the two second measuring casings (8, 10, 12; 9, 11, 13) being secured on the unsteered or only slightly steered wheels (4, 5), so as to limit deviation of the arms (10, 11) during geometric measurement of the vehicle.

2. Apparatus according to claim 1, comprising a computer with a memory containing a program, wherein the program comprises the following steps:

a) measuring on a forward axle (F) angles of orientation (BG, BD) of steered wheels (2, 3) relative to paths (14, 16) between facing casings comprised of a first measuring casing and a second measuring casing on a side of the vehicle, angles of orientation (NG, ND) of unsteered or only slightly steered wheels (4, 5) relative to said paths (14, 16), and transverse angles (MG, MD) relative to a path (15) established between the angular measuring means, and storing these measurements; and b) processing the stored measurements of step a) by means of a programmable processing and computation card to derive values of total parallelism and of individual parallelism relative to a chosen reference axis (GEO or SYM) of the vehicle.

3. Apparatus according to claim 2, wherein said program is predetermined for allowing changing by simple interactive control with a display screen the reference axis (GEO or SYM) for computation of the parallelisms.

4. Apparatus according to claim 3, wherein the measurements and computations are displayed and are available in real time on a display screen of a casing selected as the master casing.

5. Apparatus according to claim 2, wherein said program further comprises the steps of:

measuring and computing angles of steering $(BG_0-NG_0, ND_0-BD_0)$ of the left and right steered wheels (2 and 3) when in a centered direction and storing these values, then measuring and computing the steering angles (RG, RD) in a steered position by means of the following formulas:

$RG=BG-BG_0-NG+NG_0$ $RD=-BD+BD_0+ND-ND_0$.

6. Apparatus according to claim 2, wherein said program further comprises the step of:

measuring the inclinations (ZAG, ZAD) and the cambers (CAG, CAD) of the steered wheels (2 and 3) when in a centered direction ($CAG_0$, $CAD_0$, $ZAG_0$, $ZAD_0$), then steering the wheels to compute with the aid of the measured cambers and inclinations the value of the inclination of the steering axis (CHG, CHD) and pivoting (PIG, PID) of the steered wheels (2, 3).

7. Apparatus for geometric measurement for a vehicle having a longitudinal axis, a steering wheel, steered wheels and wheels that are only slightly steered or are not steered, comprising two first measuring casings and two second measuring casings, and an arm substantially parallel to said longitudinal axis extending from each of said second measuring casings, each arm carrying at its end angular measuring means, each of said two first measuring casings not having any arm extending therefrom, said two first measuring casings, being fixed on the steered wheels and said two second measuring casings being secured on the unsteered or only slightly steered wheels, so as to limit deviation of the arms during geometric measurement of the vehicle, and wherein paths of action or of emission and of reception or of communication between facing casings comprised of a first measuring casing and a second measuring casing on one side of the vehicle, and between the angular measuring means are substantially invariable in the course of geometric measurement of the vehicle.

8. Apparatus according to claim 7, comprising a computer with a memory containing a program, wherein the program comprises the following steps:

a) measuring on a forward axle (F) angles of orientation (BG, BD) of steered wheels (2, 3) relative to paths (14, 16) between facing casings comprised of a first measuring casing and a second measuring casing on a side of the vehicle, angles of orientation (NG, ND) of unsteered or only slightly steered wheels (4, 5) relative to said paths (14, 16), and transverse angles (MG, MD) relative to a path (15) established between the angular measuring means, and storing these measurements; and b) processing the stored measurements of step a) by means of a programmable processing and computation card to derive values of total parallelism and of individual parallelism relative to a chosen reference axis (GEO or SYM) of the vehicle.

9. Apparatus according to claim 8, wherein said program is predetermined for allowing changing by simple interactive control with a display screen the reference axis (GEO or SYM) for computation of the parallelisms.

10. Apparatus according to claim 9, wherein the measurements and computations are displayed and are available in real time on a display screen of a casing selected as the master casing.

11. Apparatus according to claim 8, wherein said program further comprises the steps of:

measuring and computing angles of steering $$(BG_0-NG_0, ND_0-BD_0)$$

of the left and right steered wheels (2 and 3) when in a centered direction and storing these values, then measuring and computing the steering angles (RG, RD) in a steered position by means of the following formulas:

$$RG=BG-BG_0-NG+NG_0$$

$$RD=-BD+BD_0+ND-ND_0.$$

12. Apparatus according to claim 8, wherein said program further comprises the steps of:

measuring the inclinations (ZAG, ZAD) and the cambers (CAG, CAD) of the steered wheels (2 and 3) when in a centered direction ($CAG_0$, $CAD_0$, $ZAG_0$), then steering the wheels to compute with the aid of the measured cambers and inclinations the value of the inclination of the steering axis (CHG, CHD) and pivoting (PIG, PID) of the steered wheels (2, 3).

* * * * *